United States Patent [19]

Williams

[11] Patent Number: 5,406,676
[45] Date of Patent: Apr. 18, 1995

[54] MULTI-DIRECTIONAL CARRIER SYSTEM FOR OPERABLE PARTITIONS

[75] Inventor: Charles E. Williams, Delavan, Wis.

[73] Assignee: Hufcor, Inc., Janesville, Wis.

[21] Appl. No.: 46,122

[22] Filed: Apr. 9, 1993

Related U.S. Application Data

[63] Continuation of Ser. No. 871,567, Apr. 17, 1992, abandoned, which is a continuation of Ser. No. 456,345, Dec. 26, 1989, abandoned.

[51] Int. Cl.6 ............................................. E05D 15/00
[52] U.S. Cl. ..................................... 16/87 R; 16/95 R
[58] Field of Search ..................... 16/87 R, 95 R, 87.2, 16/87.4 R

[56] References Cited

U.S. PATENT DOCUMENTS

| | | | |
|---|---|---|---|
| 2,654,114 | 10/1953 | Graber et al. | 16/93 |
| 3,042,960 | 7/1962 | Spork | 16/105 |
| 3,253,552 | 5/1966 | Stein | 104/94 |
| 3,293,685 | 12/1966 | Rosenbaum | 16/87.6 |
| 3,509,665 | 5/1970 | Bartlett et al. | 49/410 |
| 3,879,799 | 4/1975 | Williams | 16/89 |
| 4,141,106 | 2/1979 | Dixon | 16/89 |
| 4,401,033 | 8/1983 | Gerken | 16/95 R |
| 4,726,637 | 2/1988 | Ishizawa et al. | 312/324 |
| 4,729,615 | 3/1988 | Ishizawa et al. | 312/324 |
| 4,800,619 | 1/1989 | Hudak | 16/95 |

Primary Examiner—P. Austin Bradley
Assistant Examiner—Chuck Y. Mah
Attorney, Agent, or Firm—Michael, Best & Friedrich

[57] ABSTRACT

A multi-directional carrier includes a track and first and second ledges on the track. The ledges are relatively spaced vertically and horizontally. First and second discs are supported on a bolt in vertical spaced relation. One of the discs engages one of the ledges on one side of the bolt and the other disc engages the other ledge on the other side of the bolt. The underside of each disc has an angled surface and the upper side of each of the ledges has a complementary angled surface which is engaged by one of the disc angled surfaces. The angles of both said disc and ledge surfaces are substantially equal, being in the range of 2° to 8° to the horizontal, specifically 5°. The discs can be made of metal and the underside of each disc can also be provided with rings of suitable bearing material engaging the ledges.

12 Claims, 3 Drawing Sheets

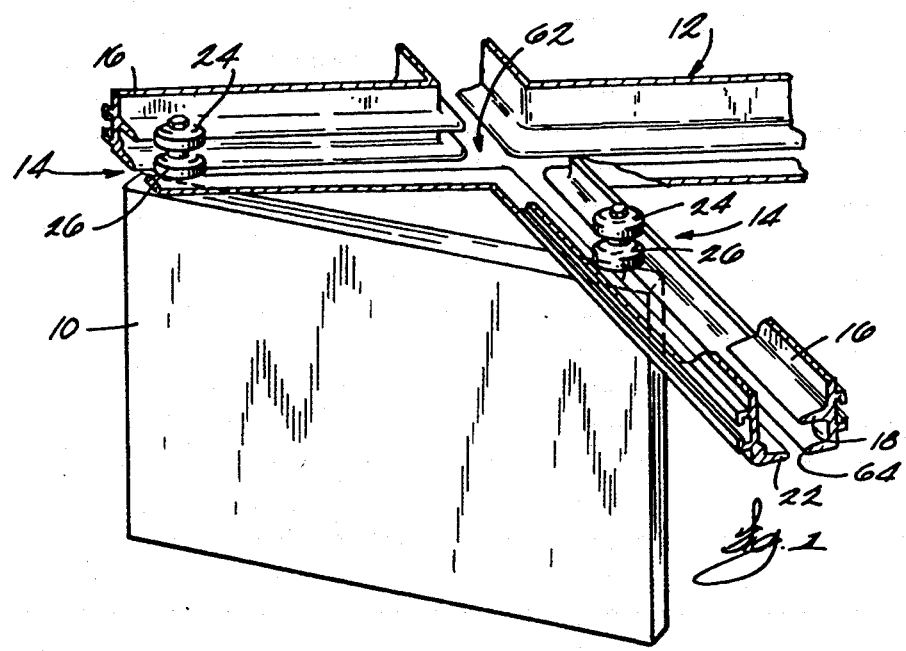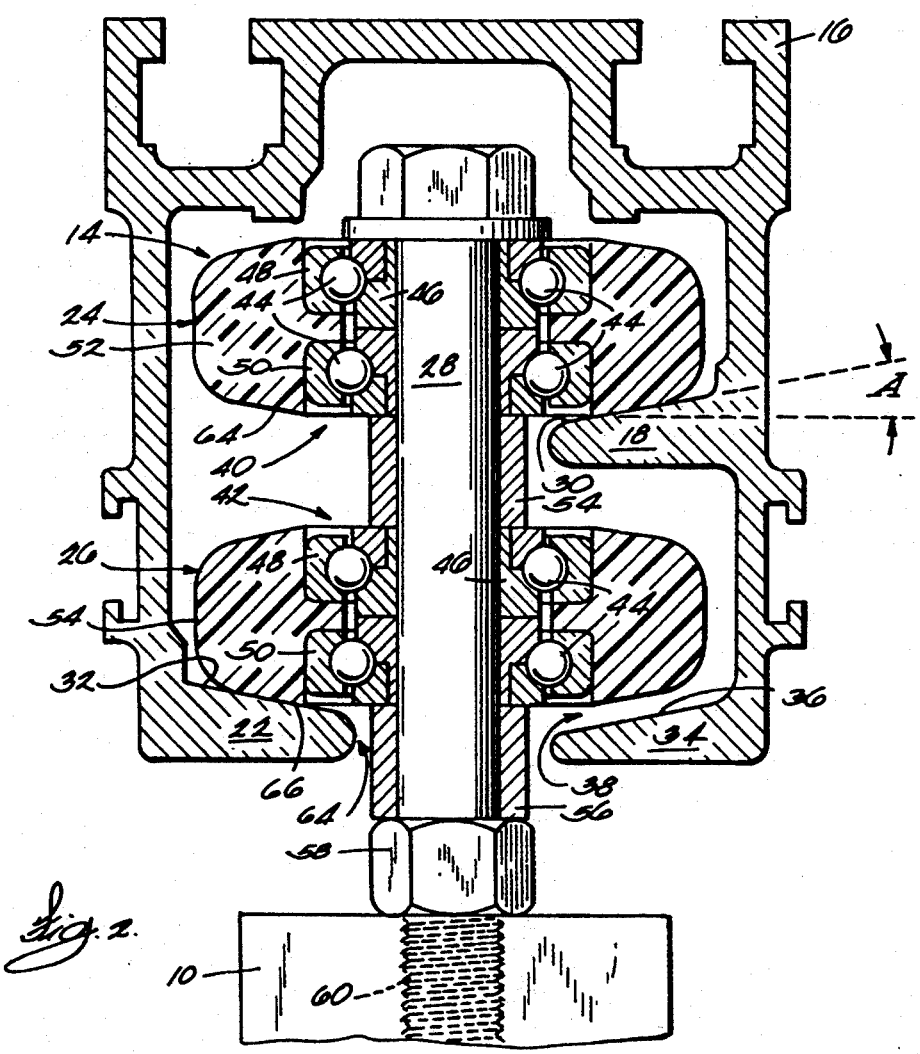

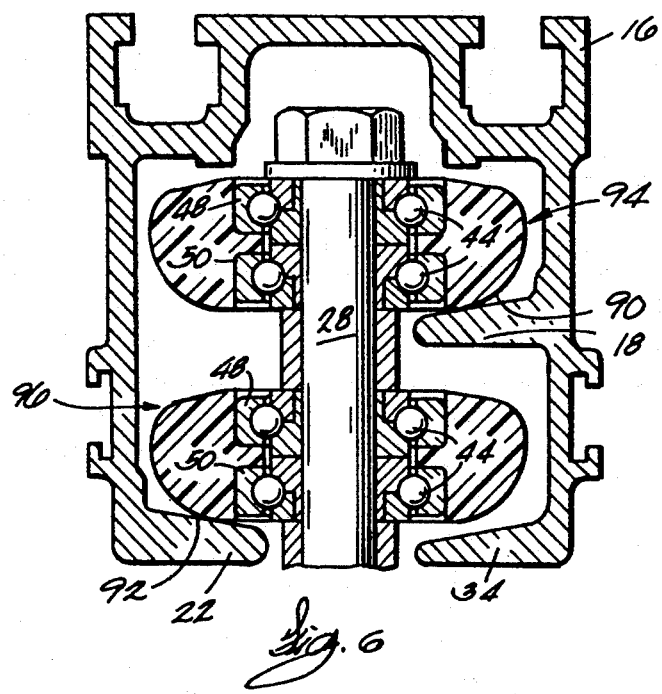
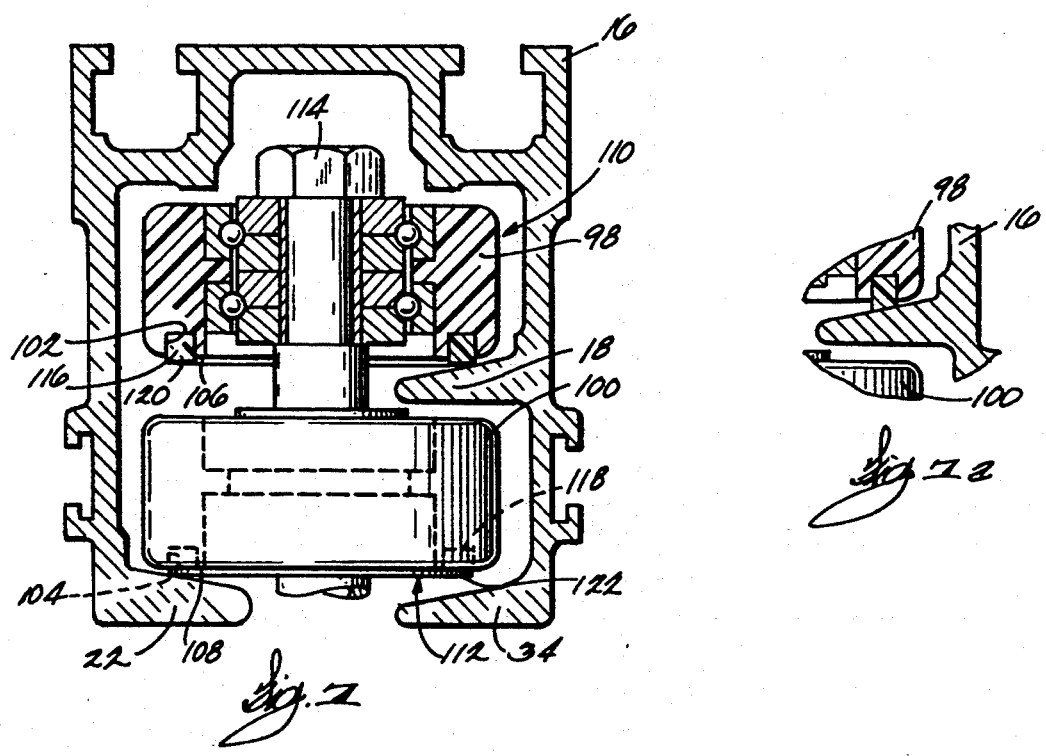

MULTI-DIRECTIONAL CARRIER SYSTEM FOR OPERABLE PARTITIONS

This is a continuation of application Ser. No. 07/871,567 filed Apr. 17, 1992 which was a continuation of application Ser. No. 07/456,345 filed Dec. 26, 1989, both now abandoned.

BACKGROUND OF THE INVENTION

This invention relates to a multi-directional suspension system for operable partitions and, more particularly, to such partition arrangements where panels are suspended from an overhead track and are movable along the track between a point of intended use and a storage area removed from the space to be subdivided.

Where large spaces are intended to be temporarily subdivided into smaller rooms in, for example, hotels, clubs, convention halls, and the like, usually a partition suspension system is provided which permits movement of subdividing panels between the point of intended use and a storage area that is removed from the space being subdivided. These involve an overhead track arrangement commonly made up of straight sections of track and right angled turns, crossovers, and T-intersections interspersed with the straight track sections.

Panels in systems of this type can be large and heavy. In many installations, the panels have to be acoustically designed for minimum transmission of sound through the panels. That can add to the weight of the individual panels.

Panels in operable partition systems of this type are usually separately supported from the track system in an unhinged relationship, and by a pair of carriers located one adjacent both the leading and trailing edges of the respective panels. The individual panels are moved from the storage area to points of use by moving them along the track straightaways on the carriers and then, as required by the track layout, around right angle turns and/or across intersections.

A significant problem with operable partition arrangements of this type has been in providing ease of movement of the panels along the track and through the track intersections, right angle turns, etc. An effective solution to that problem was provided by the construction described and claimed in my prior U.S. Pat. No. 3,879,799, which is assigned to the assignee of this application. However, some difficulties were encountered even with the carrier system of U.S. Pat. No. 3,879,799 when the carrier was called on to negotiate an intersection or right angle turn.

SUMMARY OF THE INVENTION

Among the general objects of this invention is to provide a carrier which negotiates the track intersections and/or right angle turns more effectively, particularly when transporting heavier panels.

Another general object of this invention is to provide a carrier which improves the overall movement of the panels through the track system.

For the achievement of these and other objects, this invention proposes a multi-directional carrier and track system wherein the track has first and second disc supporting surfaces arranged in relative horizontal and vertical spaced relationship. Two carrier discs are supported for rotation on an axis located between the two disc supporting surfaces and with one disc in engagement with one of the disc supporting surfaces and the other disc in engagement with the other of the disc supporting surfaces.

Preferably, the disc supporting surfaces are part of ledges located one on each side of the axis and each faces upward toward the disc which it supports. The disc supporting surfaces are disposed at an angle to the horizontal. Angles to the horizontal within the range of 4°–6°, particularly 5°, are preferred. Angles to the horizontal in the broader range of 2°–8° are also contemplated.

The underside of the carrier discs which engage the angled disc supporting surfaces are preferably angled to the horizontal as well. That carrier disc angle can be complementary to the angle of the track disc supporting surfaces, i.e., where the disc supporting surfaces are at 5° to the horizontal the angled disc surfaces are at 5° to the horizontal. Additionally, the underside of the discs can be flat or arcuate. This invention also contemplates the use of a plastic ring, preferably a suitable bearing material such as and acetal resin sold under the trademarks CELCON or DELRIN, as an insert to the underside of the disc to provide the engagement with the disc supporting surfaces.

In the preferred embodiment, the above-mentioned axis of rotation is defined by a bolt which carries the two discs. The bolt also connects to a panel so that the panel is movable with the discs along the track. The bolt is generally connected to the movable partition, or panel, so that the movable partition is supportable from the bolt and in turn from the track by the discs.

Other objects and advantages will be pointed out in, or be apparent from, the specification and claims, as will obvious modifications of the embodiment shown in the drawings in which:

FIG. 1 is a perspective view, somewhat in schematic, showing one panel suspended in accordance with this invention position at and moving through a crossover;

FIG. 2 is a view of the carrier positioned within a portion of track, both track and carrier being shown in section;

FIG. 6 is a view of an alternative embodiment, in section and showing a carrier positioned within a portion of track;

FIG. 7 is a view of another alternative embodiment, in section and showing the carrier positioned within a portion of track; and FIG. 7a is an enlarged view of a portion of FIG. 7.

DESCRIPTION OF THE PREFERRED EMBODIMENT

Figure 3:
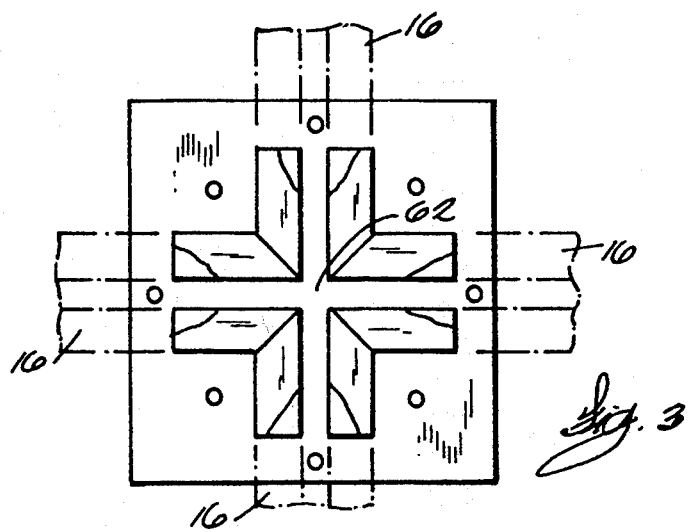
FIG. 3 is a plan view of a track crossover intersection.

Operable partition 10 is suspended from a track system by a pair of carriers 14. One carrier is connected adjacent each of the vertical edges of the panel 10. Track system 12 is made up of sections of track having a cross-sectional configuration best illustrated in FIG. 2.

With reference to FIG. 2, track section 16 includes two generally horizontal ledges 18 and 22. These ledges are spaced apart horizontally and vertically.

Each carrier 14 includes two discs 24 and 26 positioned one above the other and supported for rotation about a vertical bolt 28. Disc 24 is arranged to contact the upper facing surface 30 of ledge 18. Disc 26 is arranged to engage the upper facing surface 32 of ledge 22. With this arrangement, discs 24 and 26 engage only a single ledge 18 and 22 respectively. The discs are thus capable of rolling movement on the ledges 18 and 22 as the panel is moved through the track arrangement 12. Bolt 28 defines an axis of rotation and the discs rotate about bolt 28 as the panel is moved along and through the track section.

Track 16 is generally made of extruded aluminum or formed steel and in the preferred construction, only one ledge 18 is provided under disc 24 as there is no need for a disc on the lefthand side of the track as viewed in FIG. 2. With respect to disc 26, it should be similarly noted that only one ledge, ledge 22, need be provided under the disc 26, but for aesthetic purposes a masking ledge 34 is provided on the righthand side of disc 26 as viewed in FIG. 2. Disc 26 is spaced from the upper surface 36 of ledge 34 so that the disc 26 remains free to rotate as a result of engagement with only ledge surface 32. This is accomplished by providing ledge 34 with a thickness which is less than the thickness of ledge 22, thereby providing space 38 between disc 26 and ledge 34. As will appear from the discussion further on in this specification, masking ledge 34 may provide some operational function at the intersections of the track sections where the gap between ledges 22 and 34 becomes larger. It will also be noted that the engagement of the discs 24 and 26 with ledges 18 and 22 on opposite sides of the bolt 28 supports the bolt in an upright position.

Discs 24 and 26 are structurally supported on bolt 28 by ball bearing assemblies 40 and 42. The bearings are identically constructed so identical numbers will be used to identify identical parts in both bearings. More specifically, balls 44 are held between an inner race 46 and an outer race formed by members 48 and 50. The inner races 46 have a pressed fit on bolt 28 so that the inner races 46 are fixed relative to the bolt. Members 48 and 50 of the outer races have a pressed fit in tire portions 52 and 54 of discs 24 and 26. With this arrangement, tires 52 and 54 are free to rotate on balls 44 and relative to the fixed races 46 and the bolt 28.

Spacer 54 is provided on bolt 28 and maintains the vertical spacing between discs 24 and 26. Similarly, a spacer 56 is provided under disc 26 and between it and a nut 58 which is engaged on the lower threaded portion 60 of bolt 28. The lower threaded portion 60 of the bolt 28 is suitably attached to the top of the panel 10 in a conventional manner, not shown.

Figure 4:
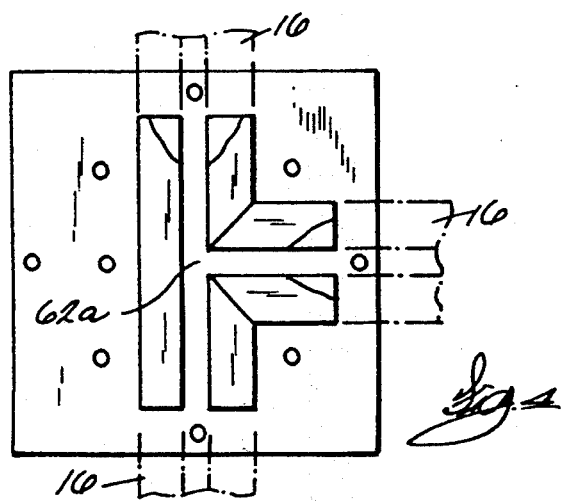
FIG. 4 is a plan view of a track right angle T-intersection.
Figure 5:
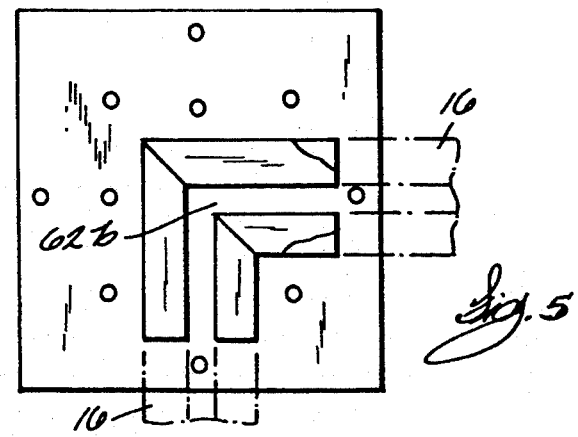
FIG. 5 is a plan view of a track right angle turn.

As the panels are moved along the track system 12, disc 24 rolls on ledge 18 and rotates in one direction while disc 26 rolls on ledge 22 but in an opposite direction relative to disc 24. When the carrier approaches an intersection, there will be a tendency for the carrier to drop into the relatively enlarged opening defined at that intersection. For example, in FIGS. 1 and 3, this opening is identified by the numeral 62 and as can be seen in the drawings, the opening is defined by the corners where the track sections come together at the intersection and will be slightly larger than the slot 64 defined between ledges 22 and 34. When the disc 26 is in that intersection opening 62, it must negotiate that larger slot and roll up onto the next series of ledges 18 and 22, either in a straight path or as the carrier turns into a new track section at the intersection. That same phenomena occurs whether the carrier is moving through the opening 62 or openings 62a and 62b in the T-intersection or right angle turn in FIGS. 4 and 5, respectively.

In the illustrated embodiment, the underside of discs 26 and 24, namely surfaces 64 and 66 are angled to the horizontal. The upper surfaces 30 and 32 of ledges 18 and 22 are also angled to the horizontal. This enhances the rolling action of the discs on the track sections and also provides good support for the carrier by assisting in maintaining the bolt 28 in an upright orientation. This angled engagement between the discs and ledges 18 and 22 is further advantageous when the carriers are called on to negotiate an opening, 62, 62a or 62b, at an intersection.. With at least the support of ledges 18 and 22 being angled, the discs will tend to roll up onto the next adjacent ledge to which it is to move and thereby assist in pulling the discs up and out of the openings, 62, 62a or 62b. Where the undersurfaces of discs are also angled, this feature of pulling up and out of openings 62, 62a or 62b is enhanced.

More specifically, the rolling action between the discs and the ledges and is enhanced by having the upper surfaces of ledges 18 and 22 angled and in engagement with correspondingly angled surfaces 64 and 66 of the discs 24 and 26. This construction provides an angled engagement between the discs and the ledges which results in a smooth rolling contact of the discs on the ledges. It also cooperates in pulling the discs up and out of the intersection openings as mentioned above.

Much of the above structure and operation is similar to that already disclosed in my prior U.S. Pat. No. 3,879,799.

In accordance with this invention it has been recognized that this rolling action and movement through the intersection openings can be greatly improved with proper attention to the angle of the ledge disc supporting surfaces, and beyond that to provide an angled surface on the underside of the disc where they engage the ledge disc supporting surfaces. The angle A of the surfaces 30 and 32 on the ledges 18 and 22 to the horizontal is within the range of 4°-6°, preferably 5°. That is, surfaces 30 and 32 are planar and in a plane which is at 5° to the horizontal. Similarly, when they are angled and when the angle A is 5° to the horizontal, the angle to the horizontal of surfaces 64 and 66 of the discs 24 and 26 is also 5°. Surfaces 64 and 66 thereby present a linear surface (linear in axial cross section through discs 24 and 26) to and for engagement with surfaces 30 and 32. It has been found that these specific angles improve the rolling action and the ability of the carriers to negotiate openings such as 62, 62a, and 62b as they are encountered in operation. The ease with which the discs will roll up out of the intersections is also enhanced. 5° is the preferred relationship but that angle can be varied between 4°-6° or, as stated above, even out to 2°-8°, and still provide effective results, but the angle should not exceed 8°.

FIGS. 6 and 7 illustrate additional embodiments of the invention.

In FIG. 6, the undersides 90, 92 of disc assemblies 94, 96 are arcuate as opposed to linear. These arcuate surfaces, when the carrier is assembled in track 16, will provide the area of engagement with ledges 18, 22.

In FIG. 7, the discs 98, 100 are made of steel and are each provided with an annular slot 102, 104 in the undersides 106, 108. Undersides 106 and 108 are horizontal. The slots are concentric with bearing assemblies 110, 112. An annular plastic ring 116, 118 is positioned in each slot. The rings are preferably made of material such as an acetal resin sold under the trademarks CELCON or DELRIN; other synthetic materials can be used so long as they exhibit suitable bearing and structural characteristics. The exposed end or outer surface of each ring will engage ledges 18, 22, when the carrier is assembled in track 16. The upper surfaces of ledges 18, 22 are at a 5° angle and outer surfaces 120, 122 of the rings are horizontal, but can be angled complementary to the angle of disc supporting surfaces of ledges 18, 22 (as shown in FIG. 7a) or arcuate as discussed in connection with the embodiment of FIG. 6.

In FIG. 7a, the underside of the exposed end of the ring is at an angle of 5° as the surface of the ledge which it engages. The ring in the other disc and ledge have the same relationship but, for convenience, have not been shown.

In the embodiment of FIG. 7, the discs can be made of metal, preferably steel, to carry heavier loads. The rings, as described above, are made of a suitable bearing material to reduce noise generated as the carriers roll on the tracks, and to reduce friction or resistance to rolling and provide a smoother running engagement between disc and track.

Although several embodiments of the present invention have been illustrated and described, it will be apparent to those skilled in the art that various changes and modifications may be made therein without departing from the spirit of the invention or from the scope of the appended claims.

I claim:

1. A multi-directional carrier and track comprising, in combination,
   a track,
   means on said track defining first and second linear disc supporting surfaces relatively spaced horizontally and vertically and defining a slot therebetween,
   first and second discs, means defining an axis and supporting said first and second discs for rotation about said axis and with said first disc in engagement with one of said disc supporting surfaces and said second disc in engagement with the other of said disc supporting surfaces, and
   said first and second disc supporting surfaces sloping downwardly and inwardly toward said slot at an angle of substantially 5° to the horizontal.

2. The multi-directional carrier of claim 1 wherein the disc supporting surfaces are part of ledges located on opposite sides of said axis and face upwardly toward the disc which it supports.

3. The multi-directional carrier of claim 2 including bolt means connected to and supporting said first discs, said bolt means defining said axis and further including means for connection to a movable partition so that said movable partition is supportable from said track by said discs.

4. The combination of claim 2
   wherein said first and second discs include generally linear surfaces engaging respective ones of said disc supporting surfaces, and
   said linear surfaces of said first and second discs are angled to the horizontal complementary to the angle of said disc supporting surfaces.

5. The combination of claim 2
   wherein said first and second discs include generally arcuate surfaces engaging respective ones of said disc supporting surfaces.

6. The combination of claim 1
   wherein said first and second discs include generally linear surfaces engaging respective ones of said disc supporting surfaces, and
   said linear surfaces of said first and second discs are angled to the horizontal complementary to the angle of said disc supporting surfaces.

7. The combination of claim 1
   wherein said first and second discs include generally arcuate surfaces engaging respective ones of said disc supporting surfaces.

8. The combination of claim 1
   including annular rings of bearing material,
   and including means connecting said rings one to the underside of each of said discs and projecting therefrom with an outer surface of each of said annular rings in engagement with respective ones of said first and second disc supporting surfaces.

9. The combination of claim 8 wherein said outer ring surfaces are linear and at an angle to the horizontal complementary to the angle of said disc supporting surfaces.

10. The combination of claim 9 wherein said discs are made of steel.

11. A multi-directional carrier comprising, in combination,
    a track,
    first and second ledges on said track, said ledges relatively spaced vertically and horizontally to define a slot therebetween,
    support means positioned between said ledges in said slot,
    first and second discs positioned on said support means in vertical spaced relation,
    one of said discs engaging one of said ledges and the other disc engaging the other of said ledges,
    means on each of said discs defining a downwardly facing, linear angled surface,
    means on the upper side of each of said ledges defining an upwardly facing, linear angled surface in engagement with the angled surface of a respective one of said discs, said ledge angled surfaces being complementary to said disc angled surfaces, and
    the angle of both said disc angled surfaces and said ledge angled surfaces being at an angle to the horizontal of substantially 5°.

12. A multi-directional carrier and track comprising, in combination,
    a track,
    means on said track defining first and second disc supporting surfaces relatively spaced horizontally and vertically and defining a slot between said disc supporting surfaces,
    first and second discs,
    means defining an axis and supporting said first and second discs for rotation about said axis and with said first disc in engagement with one of said disc supporting surfaces and said second disc in engagement with the other of said disc supporting surfaces, and
    means defining a linear, angled surface on one of said disc supporting surfaces and said discs, the angle of said linear surface being substantially 5° to the horizontal and sloping inwardly and downwardly toward said slot.

* * * * *